US008666737B2

(12) United States Patent

Nakajima et al.

(10) Patent No.: US 8,666,737 B2

(45) Date of Patent: Mar. 4, 2014

(54) NOISE POWER ESTIMATION SYSTEM, NOISE POWER ESTIMATING METHOD, SPEECH RECOGNITION SYSTEM AND SPEECH RECOGNIZING METHOD

(75) Inventors: Hirofumi Nakajima, Tokyo (JP); Kazuhiro Nakadai, Wako (JP); Yuji Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 13/232,107

(22) Filed: Sep. 14, 2011

(65) Prior Publication Data

US 2012/0095753 A1 Apr. 19, 2012

(30) Foreign Application Priority Data

Oct. 15, 2010 (JP) ................................ 2010-232979

(51) Int. Cl.

*G10L 21/02* (2013.01)
*G10L 15/06* (2013.01)
*G10L 15/20* (2006.01)
*G10L 15/00* (2013.01)
*G10L 15/14* (2006.01)
*G10L 15/28* (2013.01)

(52) U.S. Cl.

USPC ........... 704/226; 704/243; 704/233; 704/231; 704/256; 704/255; 704/236; 704/240

(58) Field of Classification Search

USPC ......... 704/243, 233, 234, 231, 256, 255, 236, 704/240, 226

See application file for complete search history.

(56) References Cited

U.S. PATENT DOCUMENTS

| | | | | |
|---|---|---|---|---|
| 5,485,522 | A * | 1/1996 | Solve et al. | 381/56 |
| 5,712,953 | A * | 1/1998 | Langs | 704/214 |
| 5,781,883 | A * | 7/1998 | Wynn | 704/226 |
| 6,098,038 | A * | 8/2000 | Hermansky et al. | 704/226 |
| 6,230,123 | B1 * | 5/2001 | Mekuria et al. | 704/226 |
| 6,519,559 | B1 * | 2/2003 | Sirivara | 704/227 |
| 6,804,640 | B1 * | 10/2004 | Weintraub et al. | 704/226 |
| 7,072,831 | B1 * | 7/2006 | Etter | 704/226 |
| 7,596,231 | B2 * | 9/2009 | Samadani | 381/94.2 |
| 7,941,315 | B2 * | 5/2011 | Matsuo | 704/226 |

(Continued)

FOREIGN PATENT DOCUMENTS

| | | | |
|---|---|---|---|
| JP | 07-262348 | A | 10/1995 |
| JP | 10-319985 | A | 12/1998 |
| JP | 2005-44349 | A | 2/2005 |
| JP | 2009-75536 | A | 4/2009 |

OTHER PUBLICATIONS

Loizou, P.: "Speech Enhancement: Theory and Practice"; 2007; CRC Press, pp. 446-453.*

(Continued)

*Primary Examiner* — Edgar Guerra-Erazo

(74) *Attorney, Agent, or Firm* — Squire Sanders (US) LLP

(57) ABSTRACT

A noise power estimation system for estimating noise power of each frequency spectral component includes a cumulative histogram generating section for generating a cumulative histogram for each frequency spectral component of a time series signal, in which the horizontal axis indicates index of power level and the vertical axis indicates cumulative frequency and which is weighted by exponential moving average; and a noise power estimation section for determining an estimated value of noise power for each frequency spectral component of the time series signal based on the cumulative histogram.

6 Claims, 7 Drawing Sheets

(56) References Cited

U.S. PATENT DOCUMENTS

| | | | | |
|---|---|---|---|---|
| 8,249,271 | B2 * | 8/2012 | Bizjak | 381/94.1 |
| 8,364,479 | B2 * | 1/2013 | Schmidt et al. | 704/228 |
| 8,489,396 | B2 * | 7/2013 | Hetherington et al. | 704/233 |
| 2002/0128830 | A1 * | 9/2002 | Kanazawa et al. | 704/226 |
| 2002/0150265 | A1 * | 10/2002 | Matsuzawa et al. | 381/94.2 |
| 2005/0004685 | A1 | 1/2005 | Seem | |
| 2005/0256705 | A1 * | 11/2005 | Kazama et al. | 704/226 |
| 2008/0010063 | A1 * | 1/2008 | Komamura | 704/226 |
| 2008/0059098 | A1 * | 3/2008 | Zhang | 702/103 |
| 2008/0281589 | A1 * | 11/2008 | Wang et al. | 704/226 |
| 2009/0063143 | A1 * | 3/2009 | Schmidt et al. | 704/233 |
| 2010/0004932 | A1 * | 1/2010 | Washio et al. | 704/255 |
| 2011/0191101 | A1 * | 8/2011 | Uhle et al. | 704/205 |
| 2011/0224980 | A1 * | 9/2011 | Nakadai et al. | 704/233 |
| 2012/0245927 | A1 * | 9/2012 | Bondy | 704/203 |
| 2013/0142343 | A1 * | 6/2013 | Matsui et al. | 381/56 |

OTHER PUBLICATIONS

Martin, R.: "Spectral subtraction based on minimum statistics", Proc. of EUSIPCO, Edinburgh, UK, Sep. 1994, pp. 1182-1185.*

K. Nakadai et al., "An Open Source Software System for Robot Audition HARK and Its Evaluation", IEEE-RAS International Conference on Humanoid Robots, Dec. 1-3, 2008, pp. 561-566.

Jean-Marc Valin et al., "Enhanced Robot Audition Based on Microphone Array Source Separation with Post-Filter", IEEE-RSJ, 2004, pp. 2123-2128.

Shun'ichi Yamamoto et al., "Making a Robot Recognize Three Simultaneous Sentences in Real-Time", IEEE/RSJ International Conference on Intelligent Robots and Systems, 2005, pp. 897-902.

Naoya Mochiki et al., "Recognition of Three Simultaneous Utterance of Speech by Four-Line Directivity Microphone Mounted on Head of Robot", International Conference on Spoken Language Processing, 2004, pp. 1-4.

Israel Cohen et al., "Speech Enhancement for Non-Stationary Noise Environments", Signal Processing, vol. 81, 2001, pp. 2403-2418.

Hirofumi Nakajima et al., "Adaptive Step-Size Parameter Control for Real-World Blind Source Separation", ICASSP2008, IEEE, 2008, pp. 149-152.

Marc Delcroix et al., "Static and Dynamic Variance Compensation for Recognition of Reverberant Speech with Dereverberation Preprocessing", IEEE Translation on Audio, Speech, and Language Processing, vol. 17, No. 2, 2009, pp. 324-334.

Yu Takahashi et al., "Real-Time Implementation of Blind Spatial Substraction Array for Hands-Free Robot Spoken Dialogue System", IROS2008, IEEE/RSJ, 2008, pp. 1687-1692.

Akinobu Lee et al., "Julius—An Open Source Real-Time Large Vocabulary Recognition Engine", 7th European Conference on Speech Communication and Technology, vol. 3, 2001, pp. 1691-1694.

Japanese Office Action for corresponding JP Appln. No. 2010-232979 dated Aug. 20, 2013.

* cited by examiner

NOISE POWER ESTIMATION SYSTEM, NOISE POWER ESTIMATING METHOD, SPEECH RECOGNITION SYSTEM AND SPEECH RECOGNIZING METHOD

BACKGROUND OF THE INVENTION

1. Field of the Invention

The present invention relates to a noise power estimation system, a noise power estimating method, a speech recognition system and a speech recognizing method.

2. Background Art

In order to achieve natural human robot interaction, a robot should recognize human speeches even if there are some noises and reverberations. In order to avoid performance degradation of automatic speech recognizers (ASR) due to interferences such as background noise, many speech enhancement processes have been applied to robot audition systems [K. Nakadai, et al, "An open source software system for robot audition HARK and its evaluation," in 2008 *IEEE-RAS Int'l Conf. on Humanoid Robots* (*Humanoids* 2008) IEEE, 2008; J. Valin, et al, "Enhanced robot audition based on microphone array source separation with post-filter," in *IROS*2004. IEEE/RSJ, 2004, pp. 2123-2128; S. Yamamoto, et. al, "Making a robot recognize three simultaneous sentences in real-time," in *IROS*2005. IEEE/RSJ, 2005, pp. 897-892; and N. Mochiki, et al, "Recognition of three simultaneous utterance of speech by four-line directivity microphone mounted on head of robot," in 2004 *Int'l Conf. on Spoken Language Processing* (*ICSLP*2004) 2004, p. WeA1705o.4.]. Speech enhancement processes require noise spectrum estimation.

For example, the Minima-Controlled Recursive Average (MCRA) method [I. Cohen and B. Berdugo, "Speech enhancement for non-stationary noise environments," *Signal Processing*, vol. 81, pp. 2403-2481, 2001.] is employed for noise spectrum estimation. MCRA tracks the minimum level spectra and judges whether the current input signal is voice active or not (inferring noise) based on the ratio of the input energy and the minimum energy after applying a consequent thresholding operation. This means that MCRA implicitly assumes that the minimum level of the noise spectrum does not change. Therefore, if the noise is not steady-state and the minimum level changes, it is very difficult to set the threshold parameter to a fixed value. Moreover, even if a fine tuned threshold parameter for a non-steady-state noise works properly, the process will fail easily for other noises, even for usual steady-state noises.

Thus, to carry out a speech enhancement process by appropriately setting parameters for noise environment changes has been difficult.

In other words, a noise power estimation system, a noise power estimating method, an automatic speech recognition system and an automatic speech recognizing method that do not require a level based threshold parameter and have high robustness against noise environment changes have not been developed.

Accordingly, there is a need for a noise power estimation system, a noise power estimating method, an automatic speech recognition system and an automatic speech recognizing method that do not require a level based threshold parameter and have high robustness against noise environment changes.

SUMMARY OF THE INVENTION

A noise power estimation system according to the first aspect of the present invention is that for estimating noise power of each frequency spectral component The noise power estimation system includes a cumulative histogram generating section for generating a cumulative histogram for each frequency spectral component of a time series signal, in which the horizontal axis indicates index of power level and the vertical axis indicates cumulative frequency and which is weighted by exponential moving average; and a noise power estimation section for determining an estimated value of noise power for each frequency spectral component of the time series signal based on the cumulative histogram.

The noise power estimation system according to the present aspect determines an estimated value of noise power for each frequency spectral component of the time series signal based on the cumulative histogram which is weighted by exponential moving average. Accordingly, the system is highly robust against noise environmental changes. Further, since the system uses the cumulative histogram which is weighted by exponential moving average, it does not require threshold parameters which have to be based on the level.

A noise power estimation system according an embodiment of the present invention is a noise power estimation system according to the first aspect of the present invention, and the noise power estimation section regards a value of noise power corresponding to a predetermined ratio of cumulative frequency to the maximum value of cumulative frequency as the estimated value.

According to the present embodiment, cumulative frequency corresponding to the noise power can be easily determined based on a predetermined ratio of cumulative frequency to the maximum value of cumulative frequency. The predetermined ratio can be determined in consideration of frequency of target speeches, for example.

In a speech recognition system according to the second aspect of the present invention, spectral subtraction is performed using estimated values of noise power which have been obtained for each frequency spectral component by the noise power estimation system according to the first aspect of the present invention.

The speech recognition system according to the present aspect does not require threshold parameters which have to be based on the level and is highly robust against noise environmental changes.

A noise power estimating method according to the third aspect of the present invention is that for estimating noise power of each frequency spectral component. The present method includes the steps of generating, by a cumulative histogram generating section, a cumulative histogram for each frequency spectral component of a time series signal, in which the horizontal axis indicates index of power level and the vertical axis indicates cumulative frequency and which is weighted by exponential moving average; and determining, by a noise power estimation section, an estimated value of noise power for each frequency spectral component of the time series signal based on the cumulative histogram. In the present method, noise power is continuously estimated by repeating the two steps described above.

In the noise power estimation method according to the present aspect, an estimated value of noise power for each frequency spectral component of the time series signal is determined based on the cumulative histogram which is weighted by exponential moving average. Accordingly, the method is highly robust against noise environmental changes. Further, since the method uses the cumulative histogram which is weighted by exponential moving average, it does not require threshold parameters which have to be based on the level.

A noise power estimation method according an embodiment of the present invention is a noise power estimating method according to the third aspect of the present invention, and the noise power estimation section regards a value of noise power corresponding to a predetermined ratio of cumulative frequency to the maximum value of cumulative frequency as the estimated value.

According to the present embodiment, cumulative frequency corresponding to the noise power can be easily determined based on a predetermined ratio of cumulative frequency to the maximum value of cumulative frequency. The predetermined ratio can be determined in consideration of frequency of target speeches, for example.

In a speech recognition method according to the fourth aspect of the present invention, spectral subtraction is performed using estimated values of noise power which have been obtained for each frequency spectral component by the noise power estimation method according to the third aspect of the present invention.

The speech recognition method according to the present aspect does not require threshold parameters which have to be based on the level and is highly robust against noise environmental changes.

DETAILED DESCRIPTION OF THE INVENTION

Figure 1:
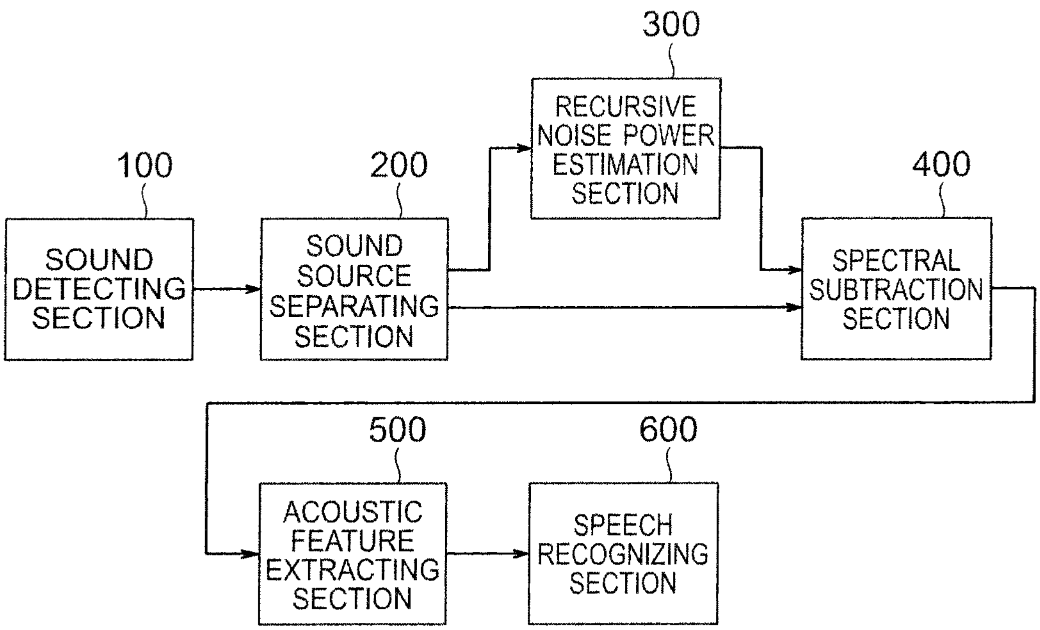
FIG. 1 illustrates a configuration of a speech recognition system according to an embodiment of the present invention.

FIG. 1 illustrates a configuration of a speech recognition system according to an embodiment of the present invention. The speech recognition system includes a sound detecting section 100, a sound source separating section 200, a recursive noise power estimation section 300, a spectral subtraction section 400, an acoustic feature extracting section 500 and a speech recognizing section 600.

The sound detecting section 100 is a microphone array consisting of a plurality of microphones installed on a robot, for example.

The sound source separating section 200 performs linear speech enhancement process. The sound source separating section 200 obtains acoustic data from the microphone array and separates sound sources using linear separating algorithm which is called GSS (Geometric Source Separation), for example. In the present embodiment, a method called GSS-AS which is based on GSS and provided with step size adjustment technique is used [H. Nakajima, et. al., "Adaptive step-size parameter control for real world blind source separation," in *ICASSP* 2008. IEEE, 2008, pp. 149-152.]. The sound source separating section 200 may be realized by any other system besides the above-mentioned one by which directional sound sources can be separated.

The recursive noise power estimation section 300 performs recursive noise power estimation for each frequency spectral component of sound of each sound source separated by the sound source separating section 200. The structure and function of the recursive noise power estimation section 300 will be described in detail later.

The spectral subtraction section 400 subtracts noise power for each frequency spectral component estimated by the recursive noise power estimation section 300 from the frequency spectral component of sound of each sound source separated by the sound source separating section 200. Spectral subtraction is described in the documents [I. Cohen and B. Berdugo, "Speech enhancement for non-stationary noise environments," *Signal Processing* vol. 81, pp. 2403-2481, 2001; M Delcroix, et al., "Static and dynamic variance compensation for recognition of reverberant speech with dereverberation processing," *IEEE Trans. on Audio, Speech, and Language Processing*, vol. 17, no. 2, pp. 324-334, 2009; and Y. Takahashi, et al., "Real-time implementaion of blind spatial subtraction array for hands-free robot spoken dialogue system," in *IROS*2008. IEEE/RSJ, 2008, pp. 1687-1692.]. In place of spectral subtraction, the Minimum Mean Square Error [IMMSE] may be used [J. Valin, et al, "Enhanced robot audition based on microphone array source separation with post-filter," in *IROS*2004. IEEE/RSJ, 2004, pp. 2123-2128; and S. Yamamoto, et al, "Making a robot recognize three simultaneous sentences in real-time," in *IROS*2005. IEEE/RSJ, 2005, pp. 897-892.].

Thus, the recursive noise power estimation section 300 and the spectral subtraction section 400 perform non-linear speech enhancement process.

The acoustic feature extracting section 500 extracts acoustic features based on output of the spectral subtraction section 400.

The speech recognizing section 600 performs speech recognition based on output of the acoustic feature extracting section 500.

The recursive noise power estimation section 300 will be described below.

Figure 2:
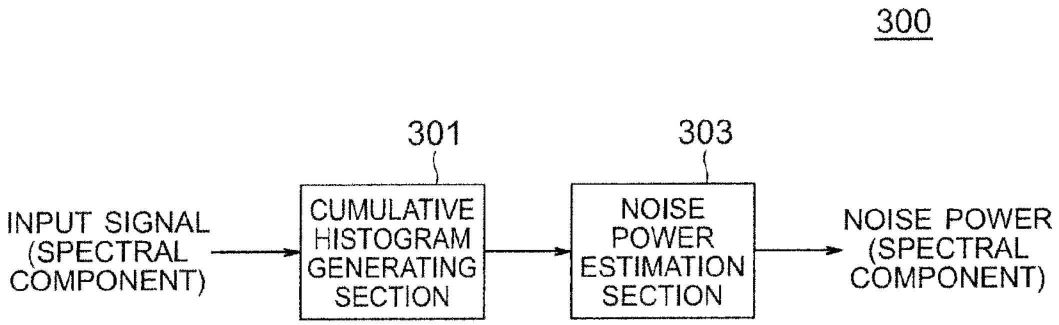
FIG. 2 illustrates a configuration of the recursive noise power estimation section

FIG. 2 shows a configuration of the recursive noise power estimation section 300. The recursive noise power estimation section 300 includes a cumulative histogram generating section 301 and a noise power estimation section 303. The cumulative histogram generating section 301 generates a cumulative histogram for each frequency spectral component of time-series input signal. The cumulative histogram is weighted by a moving average. In the cumulative histogram, the horizontal axis indicates power magnitude index while the vertical axis indicates cumulative frequency. The cumulative histogram weighted by a moving average will be described later. The noise power estimation section 303 obtains an estimated value of noise power for each frequency spectral component of input signal based on the cumulative histogram.

Figure 3:
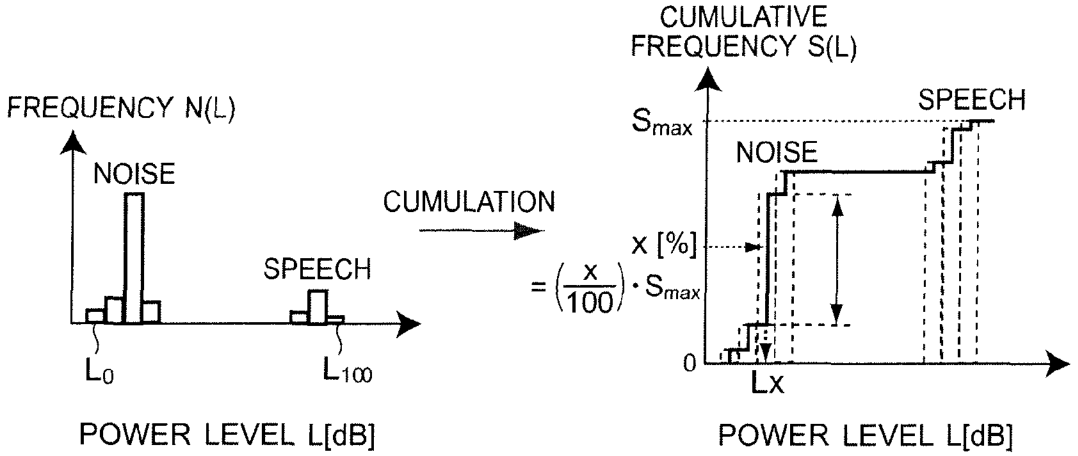
FIG. 3 illustrates a cumulative histogram generated by the cumulative histogram generating section.

FIG. 3 illustrates a cumulative histogram generated by the cumulative histogram generating section 301. The graph on the left side of FIG. 3 shows a histogram. The horizontal axis indicates index of power level while the vertical axis indicates frequency. In the graph on the left side of FIG. 3, $L_0$ denotes the minimum level of power while $L_{100}$ denotes the maximum level of power. When a robot performs speech recognition while moving, main noise is ego noise caused by fans and other components of the robot and target signals are speeches of speakers. In such a case, in general, power level of noise is less than that of speeches made by speakers. Further, occurrence frequency of noise is significantly greater than that of speeches made by speakers. The graph on the right side of FIG. 3 shows a cumulative histogram. In the graph on the right side of FIG. 3, x of $L_x$ indicates a position in the vertical axis direction of the cumulative histogram. For example, $L_{50}$ indicates the median which corresponds to 50 in the vertical axis direction. Since power level of noise is less than that of speeches made by speakers and occurrence frequency of noise is significantly greater than that of speeches made by speakers, a value of $L_x$ remains unchanged for x in a certain range as shown with a bidirectional arrow in the graph on the right side of FIG. 3. Accordingly, when the certain range of x is determined and $L_x$ is obtained, a power level of noise can be estimated.

Figure 4:
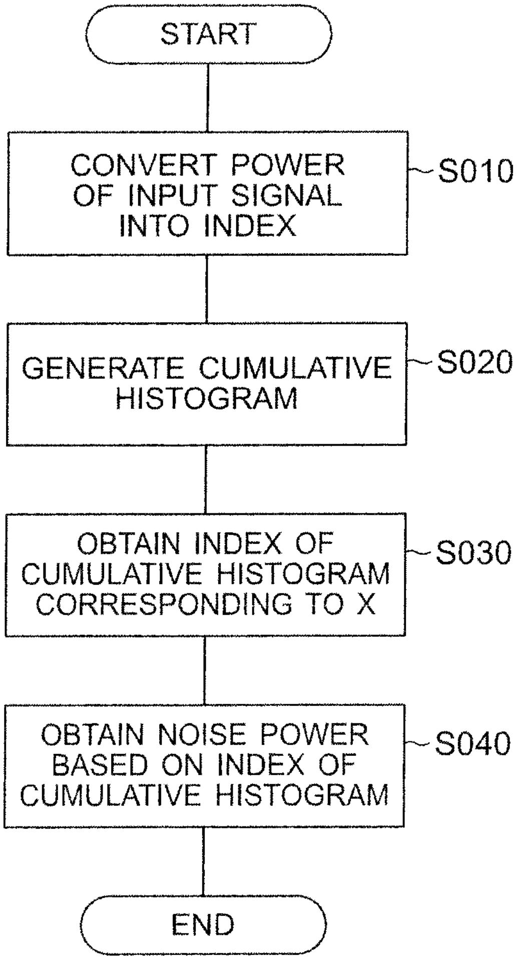
FIG. 4 is a flowchart for illustrating operations of the recursive noise power estimation section.

FIG. 4 is a flowchart for illustrating operations of the recursive noise power estimation section 303. Symbols used in an explanation of the flowchart are given below.

t Current time step i Integer index y(t) Input signal that has complex values for processes in time frequency domain $\lfloor \bullet \rfloor$ Flooring function N(t,i) Frequency S(t,i) Cumulative frequency $L_{min}$ Minimum power level $L_{step}$ Level width of 1 bin $I_{max}$ Maximum index of cumulative histogram δ Dirac delta function In step S010 of FIG. 4, the cumulative histogram generating section 301 converts power of the input signal into index ung the following expressions.

$$Y_L(t)=20\log_{10}|y(t)| \tag{1}$$

$$I_y(t)=\lfloor (Y_L(t)-L_{min})/L_{step} \rfloor \tag{2}$$

The conversion from power into index is performed using a conversion table to reduce calculation time.

In step S020 of FIG. 4, the cumulative histogram generating section 301 updates a cumulative histogram ung the following expressions.

$$N(t,i) = \alpha N(t-1,i) + (1-\alpha)\delta(i - I_y(t)) \tag{3}$$

$$S(t,i) = \sum_{k=0}^{i} N(t,k) \tag{4}$$

α is the time decay parameter that is calculated from time constant Tr and sampling frequency Fs using the following expression.

$$\alpha = 1 - \frac{1}{(T_r F_s)}$$

The cumulative histogram thus generated is constructed in such a way that weights of earlier data become smaller. Such a cumulative histogram is called a cumulative histogram weighted by moving average. In expression (3), all indices are multiplied by α and (1−α) is added only to index $I_y(t)$. In actual calculation, calculation of Expression (4) is directly performed without calculation of Expression (3) to reduce calculation time. That is, in Expression (4), all indices are multiplied by α and (1−α) is added to indices from $I_y(t)$ to $I_{max}$. Further, in actuality, an exponentially incremented value $(1-\alpha)\alpha^{-t}$ is added to indices from $I_y(t)$ to $I_{max}$ instead of (1−α) and thus operation of multiplying all indices by α can be avoided to reduce calculation time. However, this process causes exponential increases of S(t,i). Therefore, a magnitude normalization process of S(t,i) is required when $S(t,I_{max})$ approaches the maximum limit value of the variable.

In step S030 of FIG. 4, the noise power estimation section 303 obtains an index corresponding to x using the following expression.

$$I_x(t) = \text{argmin}\left[\left|S(t, I_{max})\frac{x}{100} - S(t,i)\right|\right] \tag{5}$$

In the expression, argmin means I which minimizes a value in the bracket [ ]. In place of search using Expression (5) for all indices from 1 to $I_{max}$, search is performed in one direction from the index $I_x(t-1)$ found at the immediately preceding time so that calculation time is significantly reduced.

In step S040 of FIG. 4, the noise power estimation section 303 obtains an estimate of noise power using the following expression.

$$L_x(t)=L_{min}+L_{step}\cdot I_x(t) \tag{6}$$

The method shown in FIG. 4 uses 5 parameters. Minimum power level $L_{min}$, level width of 1 bin $L_{step}$ and maximum index of cumulative histogram $I_{max}$ determine the range and sharpness of the histogram. These parameters do not affect the estimated results, if proper values are set to cover the input level range with few errors. The typical values are below.

$L_{min}=-100$ $L_{step}=0.2$ $I_{max}=1000$

The maximum spectral level is assumed to be normalized to 96 dB (1 Pa).

x and α are primary parameters that influence the estimated value of noise. However, parameter x is not so sensitive to the estimated Lx value, if the noise level is stable. For example, in FIG. 3, Lx indicates the same mode value even if parameter x changes by roughly 30-70%. For unsteady noise, an estimated range of noise power level is obtained Practically, since the speech signals are sparse in the time-frequency domain, the speech occurrence frequency is mostly less than 20% of the noise occurrence frequency and the value (20%) is independent of both SNR and (vibration) frequency. Therefore, this parameter can be set only according to the preferred noise level to be estimated and not to SNR or vibration frequency. For example, if the speech occurrence frequency is 20%, x=40 is set for the median noise level, and x=80 is set for the maximum.

Also, time constant Tr does not need to be changed according to neither SNR nor to frequency. Time constant Tr controls the equivalent average time for histogram calculation. Time constant Tr should be set to allow sufficient time for both noise and speech periods. For typical interaction dialogs, such as question and answer dialogs, the typical value of Tr is 10s, because the period of most speech utterances is less than 10s.

Thus, the system according to the present invention is remarkably more advantageous than other systems in that parameters can be determined independently of the S/N ratio or the frequency. On the other hand, the conventional MCRA method requires threshold parameters for distinguishing signal from noise, which have to be adjusted according to the S/N ratio varying depending on the frequency.

Experiments

Experiments performed to proof performance of an automatic speech recognition system using the noise power estimating device according to the present invention will be described below.

1) Experimental Settings

Figure 5:
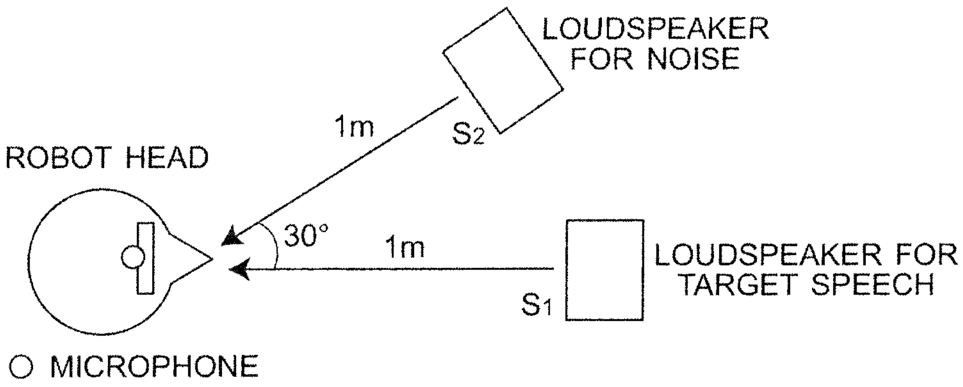
FIG. 5 shows the microphone and sound source positions.

FIG. 5 shows the microphone and sound source positions. To control SNR and to measure the true noise level, noise signal and impulse responses were measured and the input signals were synthesized with the speech signals recorded in a silent environment. The impulse responses were measured using a head embedded microphone in a humanoid robot with loudspeakers (S1 and S2) in front. Speech signals extracted from an ATR phonetically balanced Japanese word dataset were used as source signals. This dataset includes 216 words for each speaker. A measured robot noise (mainly fan noise) was used as a steady-state noise and a music signal was used as a non-steady-state noise. All experiments were performed in a time-frequency domain. To show effectiveness of the present invention, it was compared to the conventional MCRA method.

Table 1 shows parameters for the sound detecting section 100, the recursive noise power estimation section 200 according to the embodiment of the present invention and the conventional MCRA method. The MCRA parameters were identical to the parameters described in MCRA's original paper (I. Cohen and B. Berdugo, "Speech enhancement for non-stationary noise environments," *Signal Processing* vol. 81, pp. 2403-2481, 2001.).

TABLE 1

| | |
|---|---|
| Parameters of sound detecting section | |
| Sampling Rate Fs | 16 kHz |
| Window length | 512 |
| Window shift | 128 |
| Window type | hanning |
| Parameters of recursive noise power estimation section | |
| $L_{min}$ = −100 dB | $L_{step}$ = 0.2 dB |
| $I_{max}$ = 1000 | x = 50% |
| $T_r$ = 10 s | |
| Parameters of MCRA | |
| $\alpha_d$ = 0.95 | $\alpha_p$ = 0.2 |
| L = 125 | $\alpha_s$ = 0.8 |
| $\omega$ = 1 | $\delta_{th}$ = 5 |

2) Results of the Experiments

Figure 6:
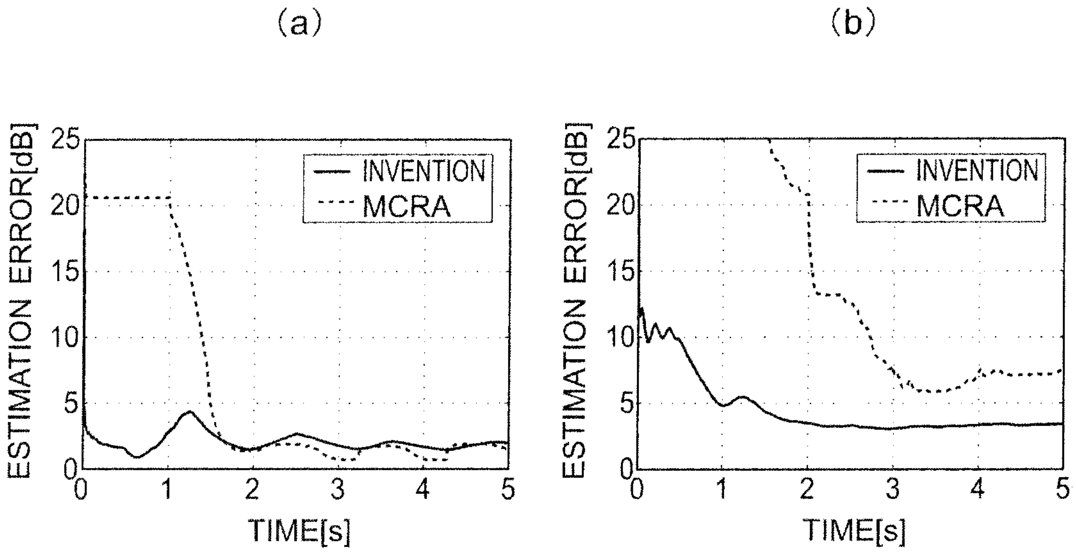
FIG. 6 shows the estimated noise errors obtained for steady-state condition and non-steady-state condition.

FIG. 6(*a*) shows the estimated noise errors obtained for steady-state condition. The horizontal and vertical axes show the time (in unit of second) and error levels (in unit of dB) respectively. The solid line in FIG. 6(*a*) represents the results of the recursive noise power estimation section according to the present embodiment while the dotted line represents the results of MCRA.

FIG. 6(*b*) shows the estimated noise errors obtained for non-steady-state condition. The horizontal and vertical axes show the time (in unit of second) and error levels (in unit of dB) respectively. The solid line in FIG. 6(*b*) represents the results of the recursive noise power estimation section according to the present embodiment while the dotted line represents the results of MCRA.

For steady-state condition shown in FIG. 6(*a*), the estimation errors are small for both methods after 1 second and there is little difference between the present embodiment and MCRA levels. However, for a non-steady-state condition shown in FIG. 6(*b*), the estimation error for the present embodiment is lower than that for MCRA by 2-5 dB and the convergence speed for the present embodiment is also faster than that for MCRA. From these results, it can be concluded noise estimation through the recursive noise power estimation section according to the present embodiment is more robust against noise environmental changes than that using MCRA.

The recursive noise power estimation section according to the present embodiment was evaluated through a robot audition system [K Nakadai, et al, "An open source software system for robot audition HARK and its evaluation," in 2008 *IEEE-RAS Int'l. Conf. on Humanoid Robots* (*Humanoids* 2008). IEEE, 2008.]. The system integrates sound source localization, voice activity detection, speech enhancement and ASR (Automatic Speech Recognition). ATR216 and Julius [A. Lee, et. al, "Julius—an open source real-time large vocabulary recognition engine," in 7*th European Conf. on Speech Communication and Technology,* 2001, vol. 3, pp. 1691-1694.] were used for ASR and a word correct rate (WCR) was used for the evaluation metric. The acoustic model for ASR was trained with enhanced speeches using only GSS-AS process applied on a large data corpus: Japanese Newspaper Article Sentences (JNAS). Three systems, that is, the base system, the MCRA system and the system of the present embodiment, were evaluated. Linear sub-process by GSS-AS was applied to all systems. The base system is a system without any non-linear enhancement sub-processes. The MCRA system uses a non-linear enhancement sub-process based on SS (Spectral Subtraction) and MCRA. The system of the present embodiment is that shown in FIG. 1. To be fair in evaluation, a gain parameter G for MCRA that magnified the estimated noise power was newly introduced. The other parameters are the same as given in Table 1. The best parameters, namely x=20 for the present embodiment and G=0.4 for MCRA were used Table 2 shows noise conditions. WCR scores were evaluated for two noise types, that is, fan (steady noise) and music (non-steady noise). Positions of the speaker for music and that for noise are shown in FIG. 5.

TABLE 2

| No. | | Noise conditions | S/N ratio (dB) |
|---|---|---|---|
| 1 | Fan | BGN (diffuse noise from robot) | 0 |
| 2 | Music | Music ($\theta$ = 30°) + BGN | 2 |

The input data was 236 isolated utterances and the estimated noises were initialized by every utterance. Since robot systems make new estimations when a new speaker emergences and restart the initialization, when the speaker vanishes, it is assumed that a dynamic environment is created, in which the speaker changes frequently.

Figure 7:
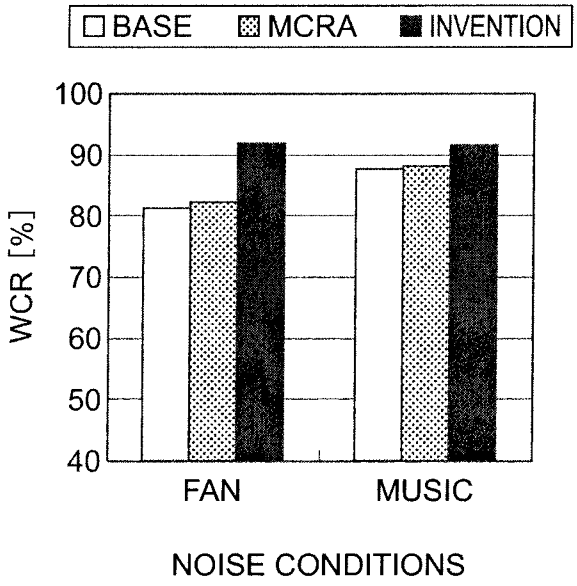
FIG. 7 shows WCR scores of the tree systems under the two noise conditions.

FIG. 7 shows WCR scores of the tree systems under the two noise conditions. The horizontal axis of FIG. 7 shows noise conditions and the vertical axis shows WCR [%]. The system of the present embodiment shows higher WCR scores under fan (steady noise) and music (non-steady noise) than the base system and the MCRA system.

What is claimed is:

1. A noise power estimation system for estimating noise power of each frequency spectral component in audio signal, comprising:

a cumulative histogram generating section configured to generate a cumulative histogram for each frequency spectral component of a time series signal, in which the horizontal axis indicates index of power level and the vertical axis indicates cumulative frequency and which is weighted by exponential moving average; and a noise power estimation section configured to determine an estimated value of noise power for each frequency spectral component of the time series signal based on the cumulative histogram.

2. A noise power estimation system according to claim 1, wherein the noise power estimation section regards a value of noise power corresponding to a predetermined ratio of cumulative frequency to the maximum value of cumulative frequency as the estimated value.

3. A speech recognition system in which spectral subtraction is performed using estimated values of noise power which have been obtained for each frequency spectral component by the noise power estimation system according to claim 1.

4. A noise power estimating method for estimating noise power of each frequency spectral component, the method comprising the steps of:

generating, by a cumulative histogram generating section comprising a noise power estimating device, a cumulative histogram for each frequency spectral component of a time series signal, in which the horizontal axis indicates index of power level and the vertical axis indicates cumulative frequency and which is weighted by exponential moving average; and determining, by a noise power estimation section, an estimated value of noise power for each frequency spectral component of the time series signal based on the cumulative histogram, wherein noise power is continuously estimated by repeating the two steps described above.

5. A noise power estimating method according to claim 4, wherein the noise power estimation section regards a value of noise power corresponding to a predetermined ratio of cumulative frequency to the maximum value of cumulative frequency as the estimated value.

6. A speech recognizing method comprising the step of performing spectral subtraction using estimated values of noise power which have been obtained for each frequency spectral component by the noise power estimating method according to claim 4.

* * * * *